United States Patent [19]

Nave, Sr.

[11] 3,744,588
[45] July 10, 1973

[54] VEHICULAR BRAKE ACTUATING DEVICE
[76] Inventor: Mac J. Nave, Sr., 2220 McKinley St., Clinton, Iowa 52732
[22] Filed: Dec. 28, 1971
[21] Appl. No.: 212,902

[52] U.S. Cl............ 180/94, 180/103, 293/4, 293/10, 293/24, 293/25
[51] Int. Cl............................................ B60r 19/02
[58] Field of Search .............. 180/91, 92, 94, 103; 293/4, 10, 25, 26, 24

[56] References Cited
UNITED STATES PATENTS

| 2,588,815 | 3/1952 | Fasolino | 180/92 |
| 2,001,093 | 5/1935 | Cherpes et al. | 180/92 |
| 579,372 | 3/1897 | Weaver | 293/10 |
| 1,686,991 | 10/1928 | Schauman et al. | 293/4 |
| 2,142,328 | 1/1939 | Mutter | 180/92 X |
| 1,755,207 | 4/1930 | Comiskey | 180/94 |
| 2,466,265 | 4/1949 | Noonan | 293/26 |
| 2,522,129 | 9/1950 | Mahring | 180/94 |

Primary Examiner—Kenneth H. Betts
Assistant Examiner—John P. Silverstrim
Attorney—Emory L. Groff et al.

[57] ABSTRACT

A motor vehicle includes a bumper assembly having a main bumper bar shock-mounted to the vehicle frame and supporting an outer contact bar which, upon impact, closes a switch-controlled circuit to actuate a solenoid coil provided with an operating arm connected to the vehicle brake pedal.

6 Claims, 8 Drawing Figures 3,744,588

INVENTOR

MAX J. NAVE

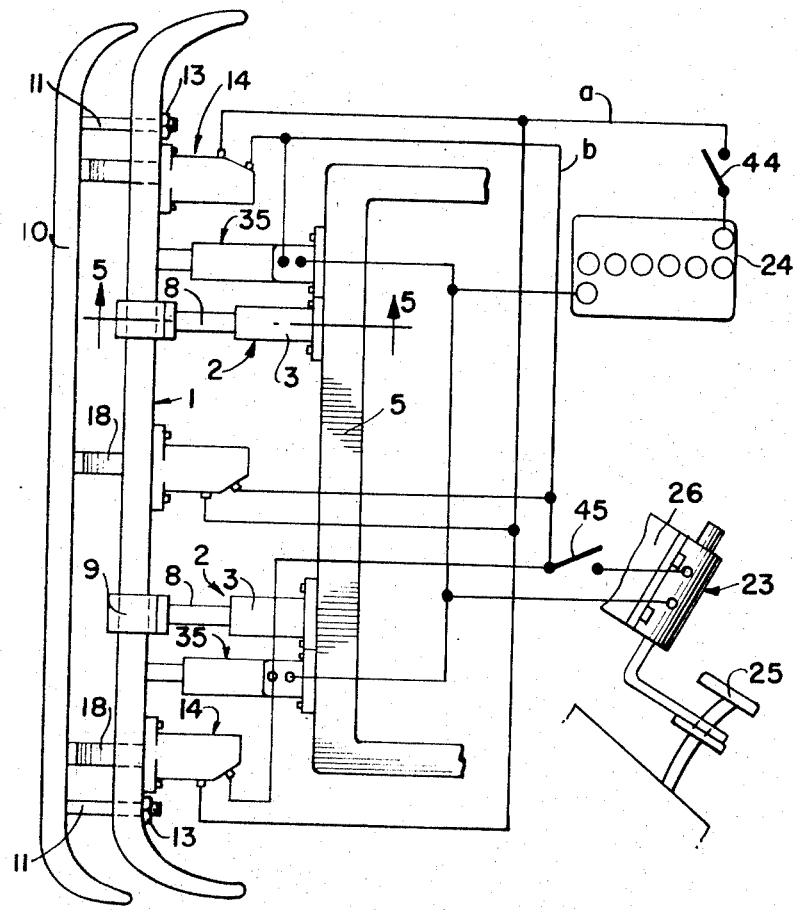
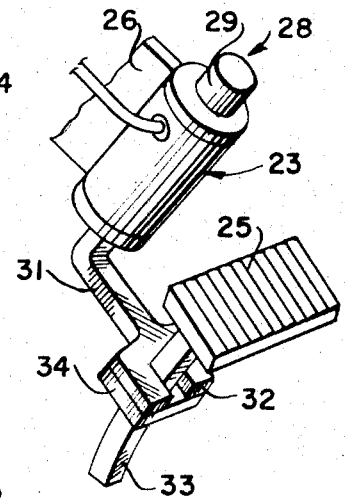
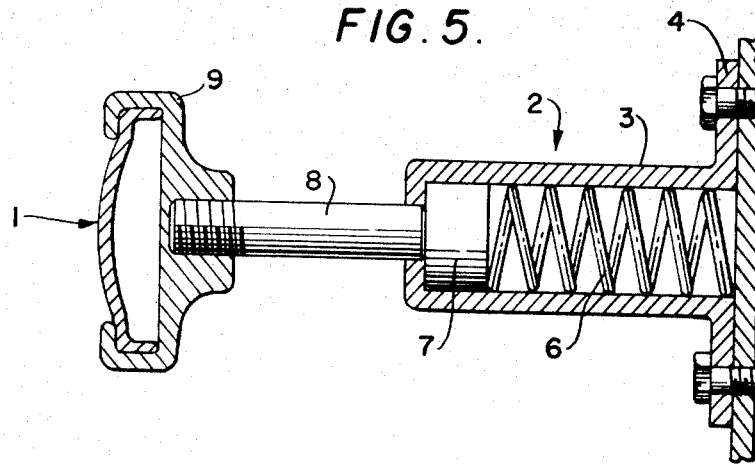

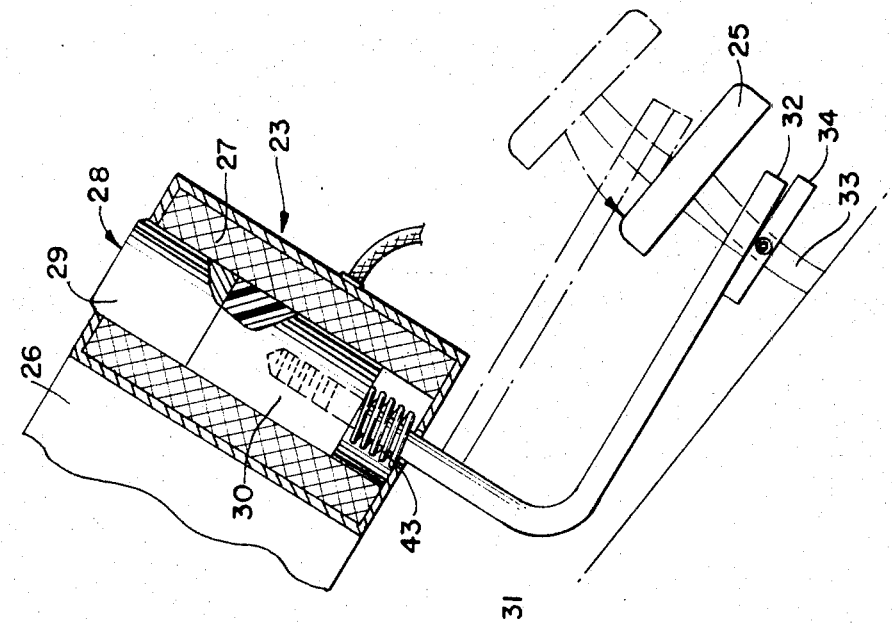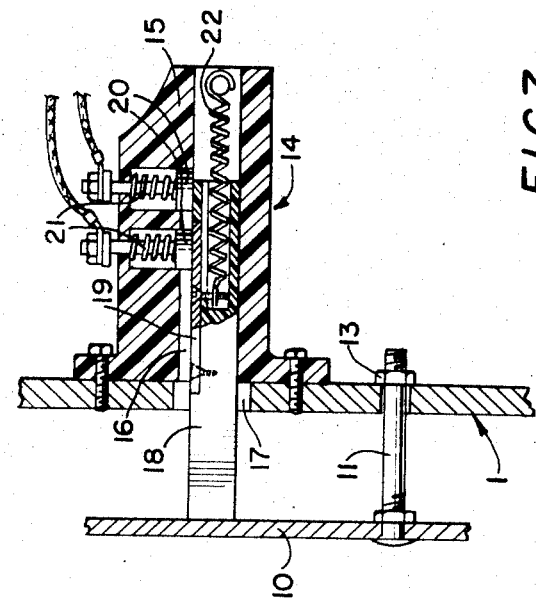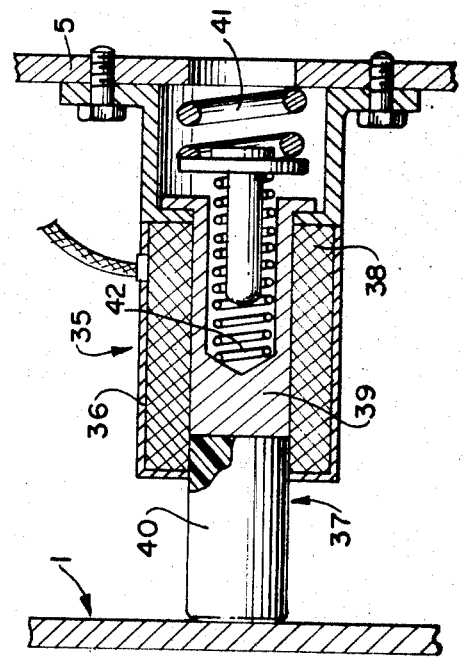

VEHICULAR BRAKE ACTUATING DEVICE

This invention relates generally to automotive safety devices, and more particularly, to an improved automatic braking system adapted to be actuated upon impact of the forward portion of the vehicle with a foreign object.

Numerous devices have been produced in the past for at least minimizing the force of a front-end collision between an automobile and another object. Usually, such measures involve no more than a resilient mounting of the bumper of the vehicle with respect to the vehicle frame such as by torsion bars or coil springs. Recent attempts also include a water-filled plastic envelope in the area of the vehicle bumper whereby upon impact, the envelope is compressed and a plurality of plugs are ejected by the force of the water as the water is urged through a plurality of ports in the envelope.

By the present invention, an improved arrangement is provided wherein a main bumper element is not only cushion-mounted with respect to the vehicular frame, but also carries a forwardly facing outer contact bar which is the initial element deflected rearwardly upon impact with an object. One or more electrical contact switches associated with the contact bar are actuated upon impact to close a circuit energizing a solenoid coil, the operation of which is adapted to depress the vehicle brake pedal to positively halt any forward motion of the vehicle. Thus, it will be appreciated that during the first instant of impact between the outer contact bar and a foreign object, the vehicle brake system will be energized and any continued forward motion of the vehicle until such time as it comes to a full stop will be absorbed and reduced by means of spring cushion means connecting the main bumper element with the vehicle frame.

Accordingly, one of the primary objects of the present invention is to provide an improved vehicular brake actuating device including electrical means energized on impact upon the bumper to apply the braking system, which arrangement is combined with a spring cushion mechanism connecting the bumper element with the frame of the vehicle.

Another object of the present invention is to provide an improved vehicular brake actuating device including a main inner bumper bar spring-mounted with respect to the vehicular frame and supporting on its outer face an overlying contact bar including a plurality of electrical switches, any one of which is actuated upon the rearward deflection of the contact bar.

Still another object of the present invention is to provide an improved automotive brake actuating system including a solenoid coil having an operating arm engageable with the vehicle brake pedal to depress same upon impact of the vehicle bumper with a foreign object.

A further object of the present invention is to provide a vehicle brake actuating system including a bumper regulated solenoid operable to depress the brake pedal by means of any one of a plurality of contact switches carried by a movable bumper.

Another object of the present invention is to provide a vehicular shock-absorbing device including a solenoid coil disposed between a spring-mounted bumper and the frame and which is actuated upon bumper contact to resist deflection of the bumper.

With these and other objects in view which will more readily appear as the nature of the invention is better understood, the invention consists in the novel construction, combination and arrangement of parts hereinafter more fully described, illustrated and claimed.

A preferred embodiment of the invention is shown in the accompanying drawings, in which:

FIG. 3 is a diagrammatic view of the components of the present invention.

FIG. 4 is a partial perspective view of the brake pedal actuating solenoid.

FIG. 5 is an enlarged view taken along the line 5—5 of FIG. 3 and illustrates one of the spring cushion assemblies joining the main bumper bar to the vehicular frame.

FIG. 6 is an enlarged sectional view of one of the contact bar switches which serve to energize both the brake pedal actuating solenoid and the bumper bar solenoid coils.

FIG. 7 is an enlarged transverse view, partly in section, of one of the solenoid coil assemblies disposed between the main bumper bar and the vehicle frame.

FIG. 8 is a side elevation, partly in section, of the brake pedal operating solenoid.

Similar reference characters designate corresponding parts throughout the several figures of the drawings.

Figure 1:
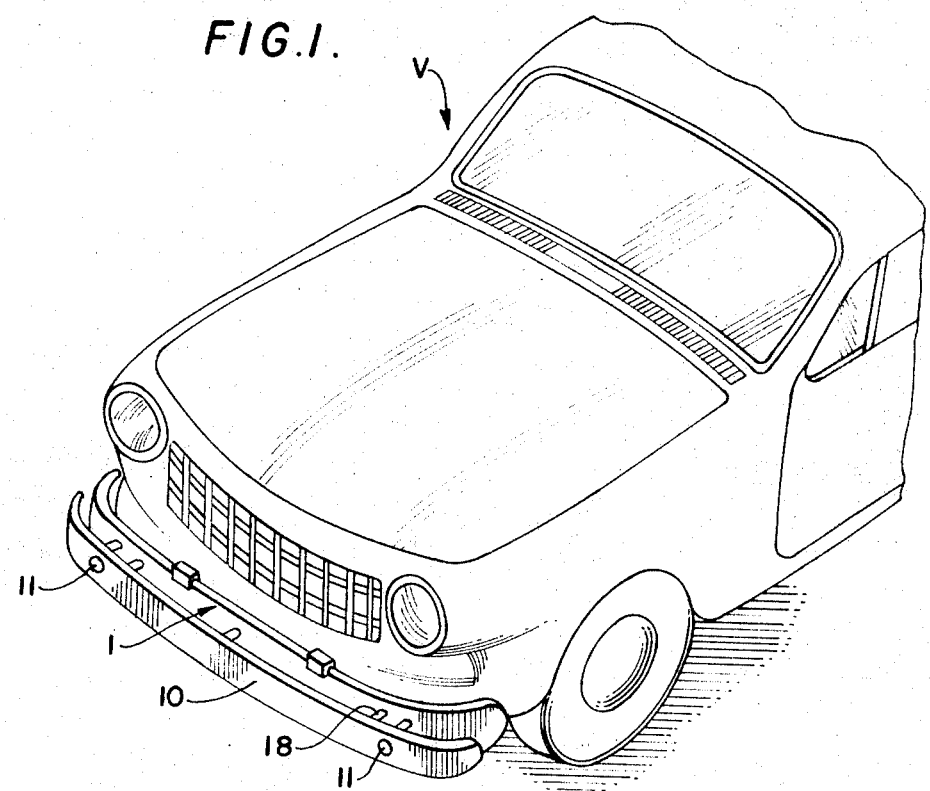
FIG. 1 is a partial perspective view of a vehicle incorporating the present invention.
Figure 2:
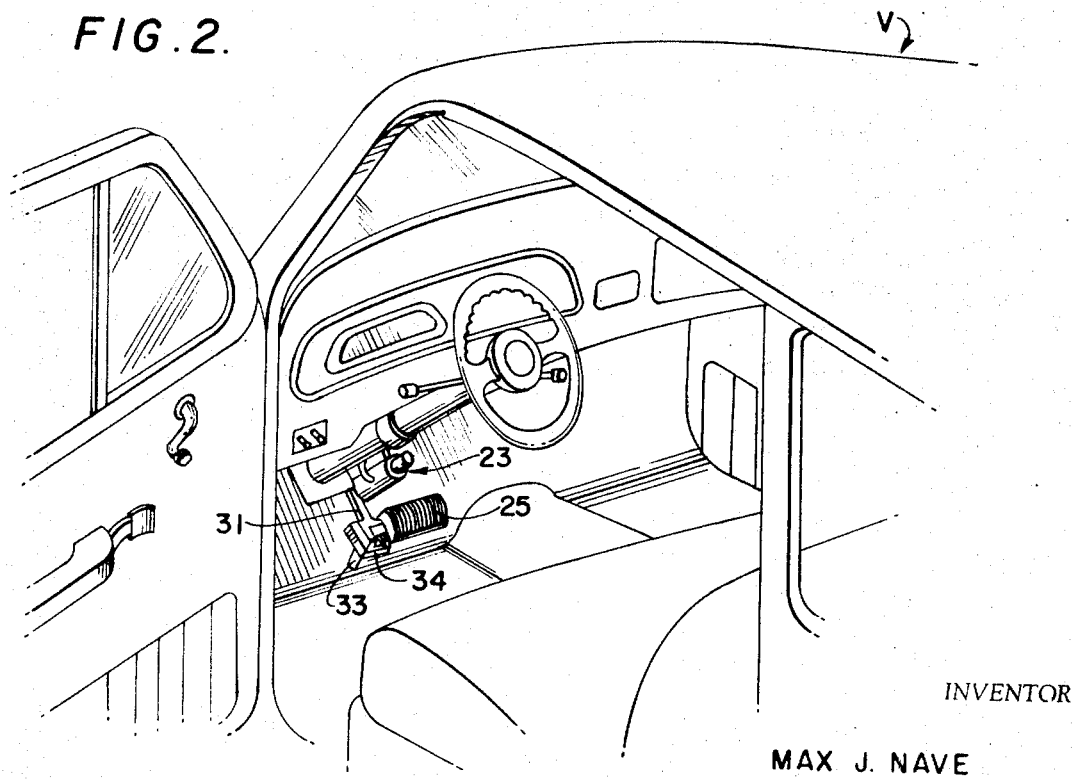
FIG. 2 is a partial perspective view of the present invention illustrating the operating solenoid connected to the vehicle brake pedal.

Referring now to the drawings, particularly FIGS. 1 and 3, the present invention will be understood to relate to a brake actuating device readily adapted to be utilized in association with any type of movable vehicle having a bumper. Unlike many prior art devices, the instant system may be employed without any significant structural modification of an existing standard motor vehicle. All of the components to be described may be substituted for a conventional vehicular bumper and its attaching brackets.

In place of a single rigid bumper bar, the present invention substitutes a main shock absorbing bumper bar, generally designated 1, which is attached to the forward portion of the vehicle V in the area of a conventional bumper bar by means of a plurality of bumper cushion assemblies, generally designated 2. As will be seen in FIGS. 3 and 5, each cushion assembly 2 includes a spring housing 3 rigidly attached by means of its mounting flanges 4 to the forward portion of the vehicle frame 5. Enclosed within the housing 3 is a coiled compression spring 6 bearing on the one hand against the frame 5 or rear of the housing, and on the other against a slidable piston 7 having an integral rod 8 projecting from the forward portion of the housing 3. Removably attached to the forwardmost end of the rod 8 is a bumper bracket 9 suitably supporting the main bumper bar 1. In the normal at-rest position as shown in FIG. 5, it will be appreciated that the bumper bar 1 will be positioned well forward of the vertical plane of any portion of the vehicle body and even when the piston 7 and rod 8 are subsequently compressed rearwardly against the force of the spring 6, it is desirable that the bumper bar 1 will still be positioned forward of any portion of the vehicle body for obvious reasons.

Mounted in a position spaced forwardly of the face of the main bumper bar 1 is an outer contact bar 10, the lateral extent of which is substantially the same as that of the main bumper bar. The contact bar 10 may be movably attached to the main bumper bar by any suitable means allowing of horizontal rectilinear movement with respect thereto, such as by the contact bar mounting and guiding bolts 11, which are fixedly attached to the contact bar and have their shank portions freely disposed through openings in the main bumper bar 1. As shown most clearly in FIG. 3, the outer contact bar 10 is normally disposed forward of the main bumper bar 1 so as to define a space 12 therebetween, which space will be determined by the mounting and guiding bolts 11 and which may be altered by varying the position of the nuts 13 on these bolts.

The contact bar is maintained in the forwardly spaced position by means of structure associated with a plurality of contact bar switches, generally designated 14. The construction of each of said switches 14 is shown in FIG. 6 wherein it will be seen that each switch comprises an insulated housing 15 fixedly attached to the rear surface of the main bumper bar 1. The housing 15 includes a horizontal bore 16 which is aligned with the opening 17 through the bumper bar 1. Slidably disposed through the opening 17 and into the bore 16 is a movable switch element 18 having its forward portion anchored with respect to the rear surface of the contact bar. The movable switch element 18 is preferably constructed of insulated material and carries along one surface thereof an electrically conductive switch plate 19. Mounted through the housing 15 adjacent the switch plate area of the element 18 are a pair of switch contacts 20—20 longitudinally disposed with respect to the travel of the movable switch element 18 and each of which are normally biased toward the direction of the switch element 18 by means of compression springs 21. In the normal at-rest position as shown in FIG. 6, the rearmost switch contact 20 will be seen to engage the insulated portion of the movable switch element 18 while the forwardmost contact 20 engages the switch plate 19. When the vehicle strikes an object, it will follow that the contact bar 10 will initially be urged rearwardly, thus urging the switch element 18 in a likewise direction against the force of the compression spring 22. As this action occurs, the rear edge of the switch plate 19 will be moved into engagement with the rearmost switch contact 20, whereupon it will be seen that the two switch contacts will be electrically connected by means of the switch plate 19, thereby completing a circuit which will be described hereinafter.

The terminals of each of the switch contacts 20 of each contact bar switch 14 are connected to electrical lines as shown in FIG. 3 which are part of a circuit including a battery and leading to a brake actuator coil, generally designated 23, and which most conveniently comprises a solenoid as shown in FIGS. 4 and 8. By placing the electrical lines in circuit with the battery 24 of the vehicle, it will be appreciated that the electrical leads thus connected to the brake actuator solenoid 23 will be energized upon closing of any one of the contact bar switches 14. The actuator solenoid 23 is fixedly attached beneath the vehicle dash in the area of the brake pedal 25 by means of a suitable mounting bracket 26. The coil 27 of the brake actuator solenoid extends the entire axial length of the solenoid and houses a sliding core generally designated 28. In order to increase the effective stroke of the core 28 when the coil 27 is energized upon closing of any of the contact bar switches 14, it is desirable to incorporate a composite core construction wherein the upper portion 29 is formed of magnetic material while the lower portion 30 is of non-magnetic composition. A brake operating arm 31 extends from the bottom of the non-magnetic portion 30 of the core 28, and includes a bifurcated distal portion 32 adapted to straddle the pedal shaft 33. Suitable abutting means such as the actuating plate 34 is secured to the brake pedal shaft 33 beneath the distal portion 32 of the operating arm 31 so that upon energizing of the brake actuator solenoid 23, it will be seen that the brake pedal 25 will be manipulated as shown in FIG. 8 to apply the vehicle brakes.

Concurrently, upon closing of the switches 14, a plurality of shock-reducing bumper solenoids 35 are actuated to resist and thus absorb a portion of the force of the main bumper bar 1 as it is being urged rearwardly. As shown in FIGS. 3 and 7, each bumper solenoid 35 includes a housing 36 fixedly attached to the vehicle frame 5 and provided with a core 37 slidably disposed within a coil 38. In order to achieve the maximum effective stroke, the core 37 is formed of two compositions as in the brake-actuating solenoid 23. The portion 39, normally substantially fully disposed within the coil 38, is magnetic while the projecting portion 40, bearing against the bumper bar 1, is non-magnetic. Thus, it will be seen that by means of the return springs 41, 42, the coil will be normally disposed as in FIG. 7. The action of these springs will be supplemented when the contact bar switches 14 are closed. As previously indicated, the bumper solenoids 35 are preferably actuated concurrently with the brake solenoid 28 whereupon it will follow that the core 37 will be urged outwardly against the rear of the bumper bar 1 at the same time the brake pedal 25 is being operated. When the forward motion of the vehicle is halted and pressure is no longer bearing upon the contact bar 10, the bumper 1 is returned to the extended position by means of the bumper solenoid springs 41, 42 and the spring cushion springs 6 while the contact bar 10 assumes its normal position due to the contact switch springs 22. Opening of the contact switches 14 then permits the brake actuator 23 to resume its at-rest position by de-energizing its coil to allow return spring 43 to function.

The continuity of the circuitry shown in FIG. 3 will now be considered. An understanding of the circuitry will be simplified by observing that the pair of leads for each of the plurality of contact bar switches 14 and bumper solenoids 35 are wired in parallel, thus a description of the action of one of each of these components will suffice. With the contact bar switch 14 in series with the battery 24 and solenoids 23 and 35, it will be seen that upon closing of one switch 14, all solenoids will operate. A switch 44 may be provided for one battery line $a$ before this line reaches any component, for the purpose of controlling the entire system. By including a second switch 45 on the line $b$ originating from the same battery terminal as line $a$ but intermediate its connection with the solenoid 35 and the brake solenoid 23, it will be seen that by closing switch 44 and leaving switch 45 open, only the bumper solenoids 35 will be operable thereby leaving the use of the brake pedal 25 to the vehicle operator. Quite obviously, alternative switch means (not shown) may be provided so that the bumper solenoids 35 would be deactivated with the result that during actuation of the switches 14 only the brake solenoid 23 would be operable to depress the brake pedal 25.

I claim:

1. A safety device for vehicles having a frame, bumper bar and brake pedal including, spring cushion means movably mounting said bumper bar to said frame, a brake solenoid operable to actuate said brake pedal, displaceable contact means carried by the forward portion of said bumper bar, switch means operable upon displacement of said contact means, a bumper solenoid disposed between said frame and bumper bar, said bumper solenoid including a coil having a core provided with a magnetic portion normally disposed within the coil and forward projecting portion engageable with the rear of said bumper bar, an electrically energized circuit joining said switch means, brake solenoid and bumper solenoid whereby, upon rearward displacement of said contact means said switch means is closed to energize said circuit and concurrently actuate said brake solenoid to operate said brake pedal and actuate said bumper solenoid to resist displacement of said bumper bar rearwardly as said bumper solenoid magnetic core portion is electrically urged to remain within its respective core.

2. A safety device for vehicles according to claim 1 wherein, said contact means comprises a bar overlying at least a portion of the face of said bumper bar.

3. A safety device for vehicles according to claim 2 wherein, said switch means includes a movable switch element engageable with said contact bar, and spring means normally urging said switch element forwardly to maintain said contact bar spaced from said bumper bar.

4. A safety device for vehicles according to claim 3 wherein, said switch means includes two contacts, said movable switch element provided with a switch plate normally engaging one of said contacts but displaceable rearwardly to additionally engage said other contact to close said circuit at said switch means.

5. A safety device for vehicles according to claim 1 wherein, said brake solenoid includes a core having a non-magnetic section normally substantially fully disposed within said solenoid and an adjacent portion of said core comprises a magnetic section normally having a significant area of its body projecting from said solenoid when not activated.

6. A safety device for vehicles according to claim 1 including, additional switch means in said circuit which when opened deactivates only said brake solenoid.

* * * * *

UNITED STATES PATENT OFFICE
CERTIFICATE OF CORRECTION

Patent No. 3,744,588     Dated July 10, 1973

Inventor(s) Max J. Nave, Sr.

It is certified that error appears in the above-identified patent and that said Letters Patent are hereby corrected as shown below:

In the heading of the patent, line 2, change "Mac J. Nave, Sr." to --Max J. Nave, Sr.--.

Signed and sealed this 20th day of August 1974.

(SEAL)
Attest:

McCOY M. GIBSON, JR.     C. MARSHALL DANN
Attesting Officer        Commissioner of Patents

FORM PO-1050 (10-69)